United States Patent
Yeh et al.

(10) Patent No.: US 7,325,125 B2
(45) Date of Patent: *Jan. 29, 2008

(54) COMPUTER SYSTEM FOR ACCESSING INITIALIZATION DATA AND METHOD THEREFOR

(75) Inventors: Bi-Yun Yeh, Taipei (TW); Shu-Tzu Wang, Taipei (TW); Heng-Chen Ho, Taipei (TW)

(73) Assignee: Via Technologies, Inc., Taipei (TW)

( * ) Notice: Subject to any disclaimer, the term of this patent is extended or adjusted under 35 U.S.C. 154(b) by 410 days.

This patent is subject to a terminal disclaimer.

(21) Appl. No.: 10/628,562

(22) Filed: Jul. 29, 2003

(65) Prior Publication Data

US 2004/0059902 A1 Mar. 25, 2004

Related U.S. Application Data

(63) Continuation-in-part of application No. 09/481,714, filed on Jan. 12, 2000, now Pat. No. 6,691,224.

(30) Foreign Application Priority Data

Jun. 14, 1999 (TW) .............................. 88109868 A

(51) Int. Cl.
*G06F 9/00* (2006.01)
(52) U.S. Cl. ............................. 713/1; 713/2; 710/104; 710/311; 710/312; 710/241
(58) Field of Classification Search ................... 713/1, 713/2
See application file for complete search history.

(56) References Cited

U.S. PATENT DOCUMENTS

| | | | |
|---|---|---|---|
| 4,213,182 A * | 7/1980 | Eichelberger et al. ...... 700/296 |
| 5,375,161 A * | 12/1994 | Fuller et al. ................ 455/417 |
| 5,592,675 A * | 1/1997 | Itoh et al. ................... 365/222 |
| 5,936,526 A * | 8/1999 | Klein .......................... 340/571 |
| 5,937,434 A * | 8/1999 | Hasbun et al. .............. 711/156 |
| 5,974,239 A * | 10/1999 | Klein .......................... 710/312 |
| 6,014,760 A * | 1/2000 | Silva et al. ..................... 705/8 |
| 6,022,274 A * | 2/2000 | Takeda et al. ................ 463/44 |
| 6,119,192 A * | 9/2000 | Kao et al. ................... 710/311 |
| 6,216,224 B1 * | 4/2001 | Klein ............................. 713/1 |
| 6,253,276 B1 * | 6/2001 | Jeddeloh ........................ 711/5 |
| 6,272,584 B1 * | 8/2001 | Stancil ....................... 710/241 |
| 6,405,311 B1 * | 6/2002 | Broyles et al. ................ 713/2 |
| 6,571,333 B1 * | 5/2003 | Jain et al. ...................... 713/2 |
| 2002/0147868 A1* | 10/2002 | Tsai ........................... 710/104 |

OTHER PUBLICATIONS

Wikipedia copies.*

* cited by examiner

*Primary Examiner*—Rehana Perveen
*Assistant Examiner*—Fahmida Rahman
(74) *Attorney, Agent, or Firm*—Rabin & Berdo, P.C.

(57) ABSTRACT

A method and computer system for accessing initialization data stored in a boot memory space. After the power supply starts up, the south bridge starts up and sends an initiating signal to the north bridge for starting up the north bridge. Once the north bridge has started up, it sends the south bridge a transaction which requests that the south bridge reads the initialization data from the memory space and sends the initialization data to the south bridge. Then, the CPU starts up and operates normally after the CPU receives an initiating signal and the initialization data sent by the north bridge.

22 Claims, 4 Drawing Sheets

COMPUTER SYSTEM FOR ACCESSING INITIALIZATION DATA AND METHOD THEREFOR

This application is a continuation-in-part of Ser. No. 09/481,714, filed Jan. 12, 2000 now U.S. Pat. No. 6,691,224.

BACKGROUND OF THE INVENTION

1. Field of the Invention

The invention relates to computer systems. More specifically, the invention relates to access initialization data stored in a non-volatile memory of a computer system.

2. Description of the Related Art

As electronic and information technology progress rapidly, more powerful, high performance and innovative peripherals for Personal Computer (PC) are available to the market. With the functionality of peripherals becomes more complicated, PC vendors tend to design PC with simpler architectures in order to have simpler circuit layouts and lower costs. Therefore, the chipset, which integrates separated logic for different functions into one chip, is designed to meet the requirement of the simplified PC architectures. Nowadays, chipsets have helped to simplify PCs' layout as well as make more space on the circuit boards of the PCs.

Referring now to FIG. 1, a conventional personal computer system is shown with components, including so-called "north bridge" and "south bridge" chipsets, in block diagram form. The various components and buses are typically formed on a main board or mother board. A personal computer system typically contains one central processing unit (CPU) 104, cache memory 106 and Dynamic Random Access Memory (DRAM) 108. The CPU 104, cache memory 106 and DRAM 108 are connected to a north bridge 102. A power supply controller 112, keyboard/mouse 114 and a boot Read-Only Memory (ROM) 116, which stores a basic input/output system (BIOS) are connected to the south bridge 110. The peripheral bus 100, such as the conventional Peripheral Component Interconnect (PCI) bus, which a number of peripherals that meet the PCI specification can be connected to, is connected to both the south bridge 110 and north bridge 102. Both the north bridge 102 and the south bridge 110 connect to and/or control the devices or peripherals working with different bandwidth and performance requirements. The north bridge 102 is designed closer to the CPU 104 so that it is used to connect to the components and/or peripherals with high bandwidth and system performance requirements, such as a DRAM 108. On the other hand, the south bridge 110 is utilized to connect lower bandwidth peripherals such as the keyboard/mouse 114.

During a conventional computer system booting procedure, the CPU sets initial values for certain parameters to be transferred through the north bridge and south bridge for initialization. The data for setting the initial values in the beginning of booting are called the initialization data. The initialization data are not included in the BIOS which is stored in the boot ROM, and they depend on the CPU that a computer system adopted. For example, the initialization data may include serial initialization packet ("SIP") data used in PCs using CPUs manufactured by Advanced Micro Devices (AMD) incorporation.

For these reasons, two conventional approaches, namely, strapping and jumping are used to set the initialization data. Strapping refers to using fixed connections of circuit to set the data, while jumping means using jumpers for an user to short two pins from a set of pins for data setting. If a few numbers of initialization data are to be set, it is suitable to set these data through hardware connections such as strapping and jumping. However, costs of applying these two approaches will increase when more initialization data are necessary to be set.

Referring now to FIG. 2, a conventional computer system is shown in block diagram form. In this design, a serial Programmable Read-Only Memory (serial PROM) 200 is included in the computer system and is utilized to store the initialization data mentioned above. The initialization data for this computer system take up about 34-byte memory space of the serial PROM. By this approach, a number of strapping and jumping for setting the initialization data are omitted.

In FIG. 2, a serial PROM 200 is connected to the north bridge 204 by two input/output ports 202 of the north bridge 204. When the computer system is powered on, the south bridge 206 is powered and sends a signal to start up the north bridge 204. After the north bridge 204 has started up, it sends a clock-like signal to the serial PROM 200 and then reads the initialization data stored in the serial PROM 200. Finally, the CPU 208 starts up and then operates normally after the CPU 208 sets its initial values for initialization using the initialization data sent by the north bridge 204.

The computer system illustrated by FIG. 2 overcomes the drawback of applying strapping or jumping approaches to setting initialization data in the conventional computer system. However, when it comes to mass production, this approach is expensive due to the use of the serial PROM, additional ports and logic for connecting the serial PROM, and necessary design modification on the north bridge.

SUMMARY OF THE INVENTION

It is therefore an object of the invention to provide a computer system and method for accessing initialization data in the computer system without using serial PROM to store the initialization data.

According to one example, the above object of the invention is achieved by a method for accessing initialization data stored in a non-volatile memory subsystem such as a boot ROM's memory space that is not used by a BIOS contained. First, a power controller of the computer system starts up a south bridge chipset. Next, a first signal is generated by the south bridge chipset in order to start up a north bridge chipset. Then, a second signal is generated by the north bridge chipset in order to request the south bridge chipset to read the initialization data from the boot ROM and to send the initialization data to the north bridge chipset. After that, a third signal is sent from the north bridge chipset in order to start up a processor and send the initialization data to the processor.

The above object of the invention is also achieved by a computer system including a south bridge chipset, a non-volatile memory subsystem, a north bridge chipset and a central processing unit (CPU). The computer system accesses initialization data stored in the memory space in the non-volatile memory subsystem that is not used by a BIOS. The south bridge chipset generates a first signal after the south bridge chipset is powered. The north bridge chipset receives the first signal, starts up, and then generates a second signal in order to request the south bridge chipset to read the initialization data and to send the initialization data to the north bridge chipset. The central processing unit (CPU) receives a third signal generated by the north bridge chipset and then starts up. After CPU has started up, the north bridge chipset sends the initialization data to the CPU.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
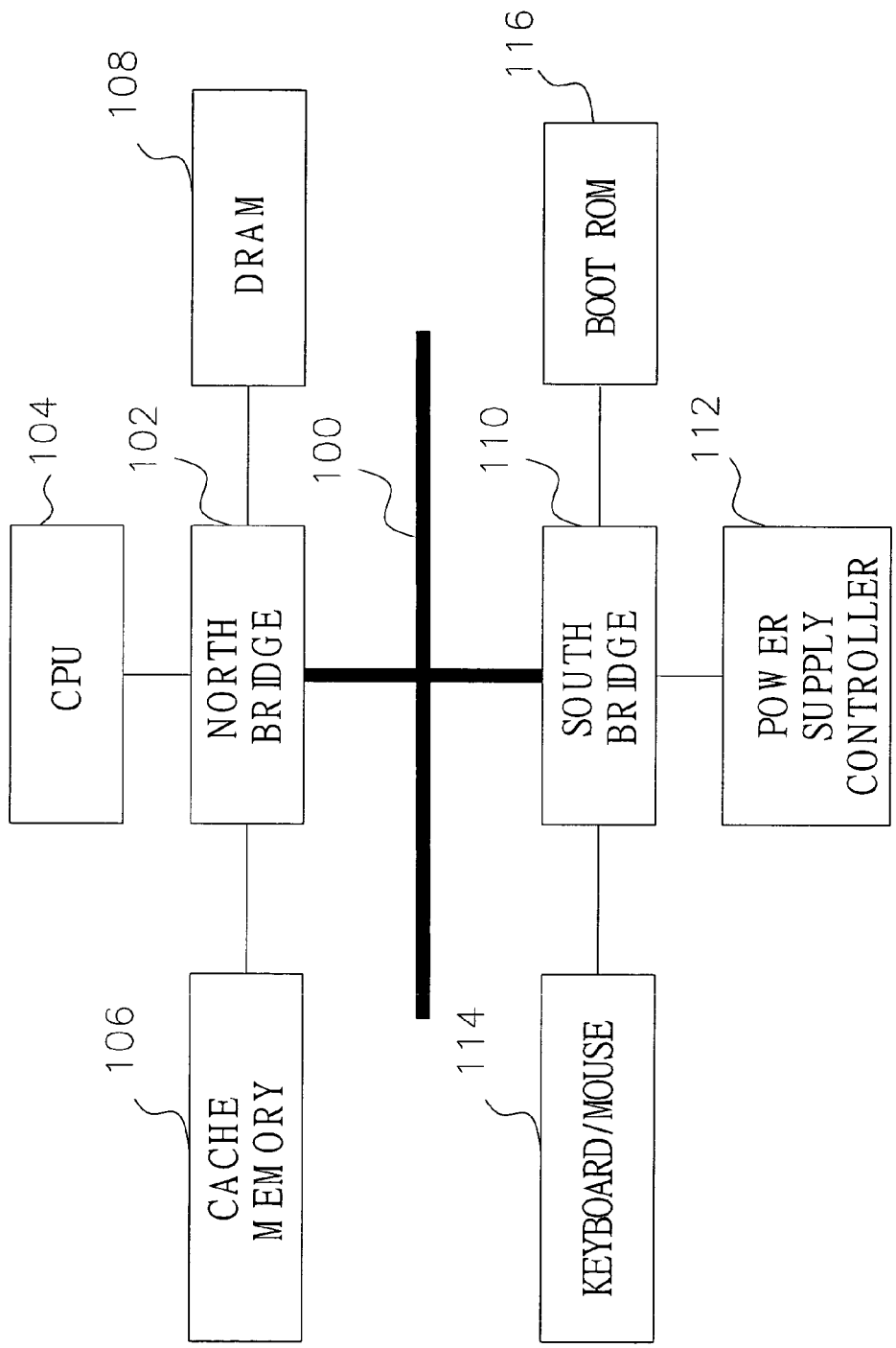
FIG. 1 is a block diagram of a conventional computer system.
Figure 2:
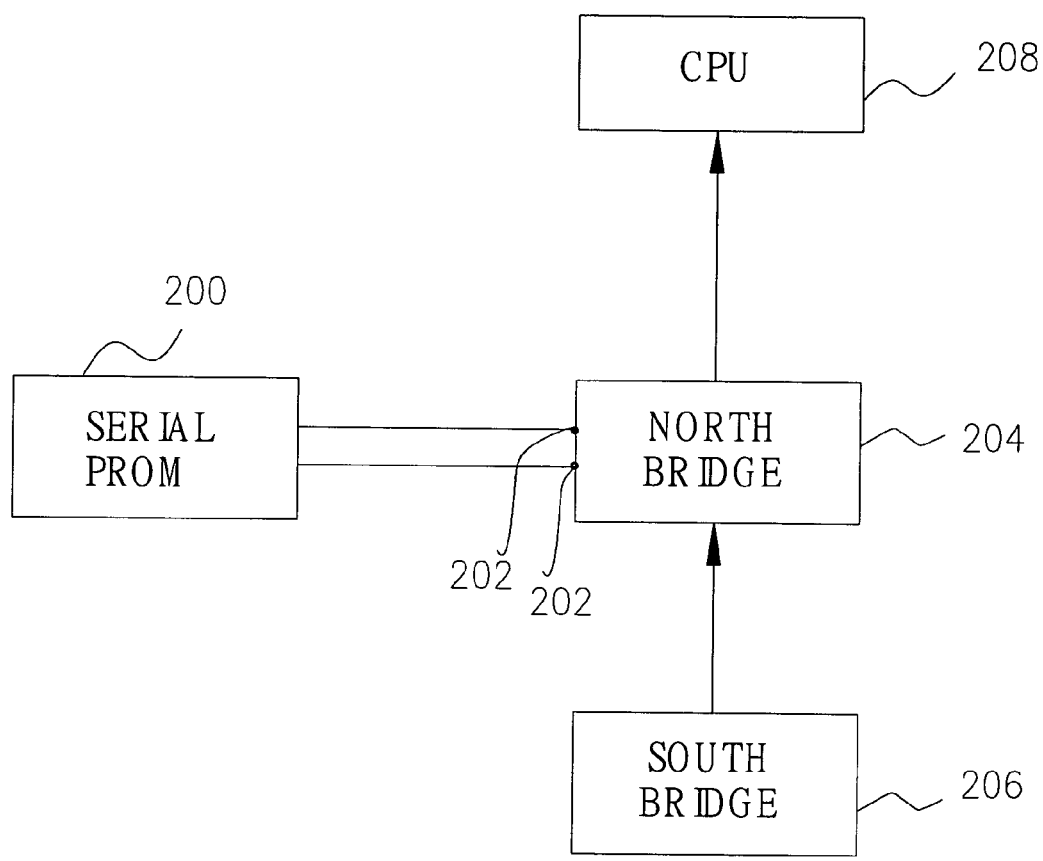
FIG. 2 is a block diagram of a part of the conventional computer system for accessing initialization data.
Figure 3:
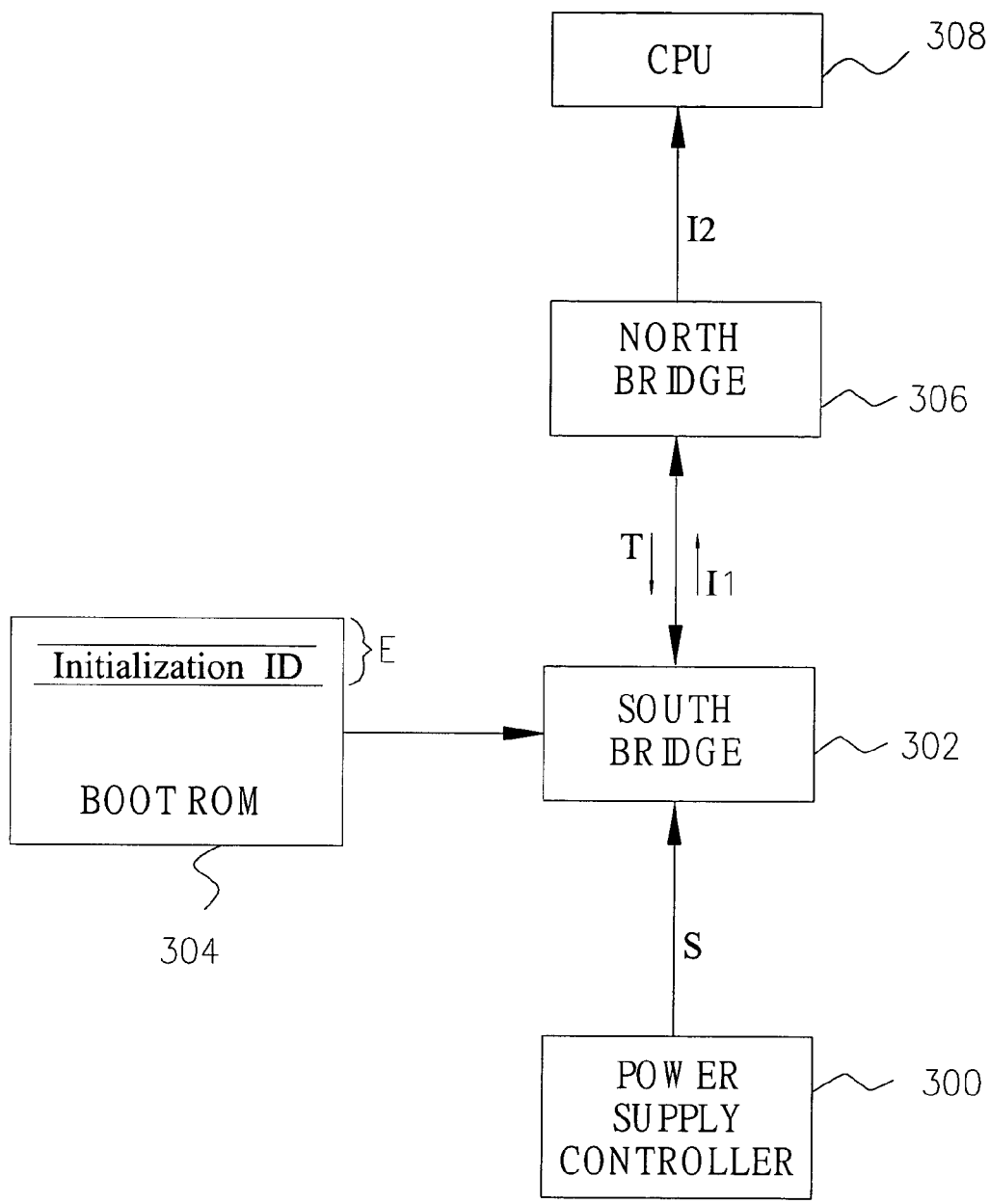
FIG. 3 is a block diagram of a part of an improved computer system in accordance with a preferred embodiment of the invention.

Referring first to FIG. 3, a computer system in accordance with the preferred embodiment of the invention is shown in block diagram form. This computer system includes a power supply controller 300, a south bridge 302, a boot ROM 304, a north bridge 306 and a CPU 308, coupled to each other as shown. When the computer system boots up, it firstly starts up the power supply of the computer system (not shown) by using the power supply controller 300. Then, after the south bridge 302 is powered by power S provided by the power supply controller 300, the south bridge 302 starts up and sends an initiating signal I1 to the north bridge 306. After receiving the initiating signal I1 and starting up, the north bridge 306 sends a transaction T to the south bridge 302. The transaction T requests that the south bridge 302 reads the initialization ID stored in the boot ROM 304 and then sends the initialization ID to the north bridge 306. Once the north bridge 306 receives this ID, it sends an initiating signal I2 to the CPU 308. After receiving the initiating signal I2, the CPU 308 starts up, completes the process of initialization.

The boot ROM 304 is a non-volatile memory that contains the BIOS. The non-volatile memory such as Erasable Programmable Read-Only Memory (EPROM), EEPROM and flash memory is usually used as the boot ROM. BIOS is a system of initialization code and interrupt service routines for the computer system's associated devices. The initialization code is for the first access of the processor of the computer system and is then used to test and initialize other devices of the computer system such as main memory, floppy disk drives and hard disk drives, and then allow other programs such as operating systems, etc., to begin execution. The boot ROM generally contains a memory space that is not used by the BIOS. It is enough to store the initialization data, such as the initialization ID and the 34-byte "SIP" data mentioned above.

Figure 4:
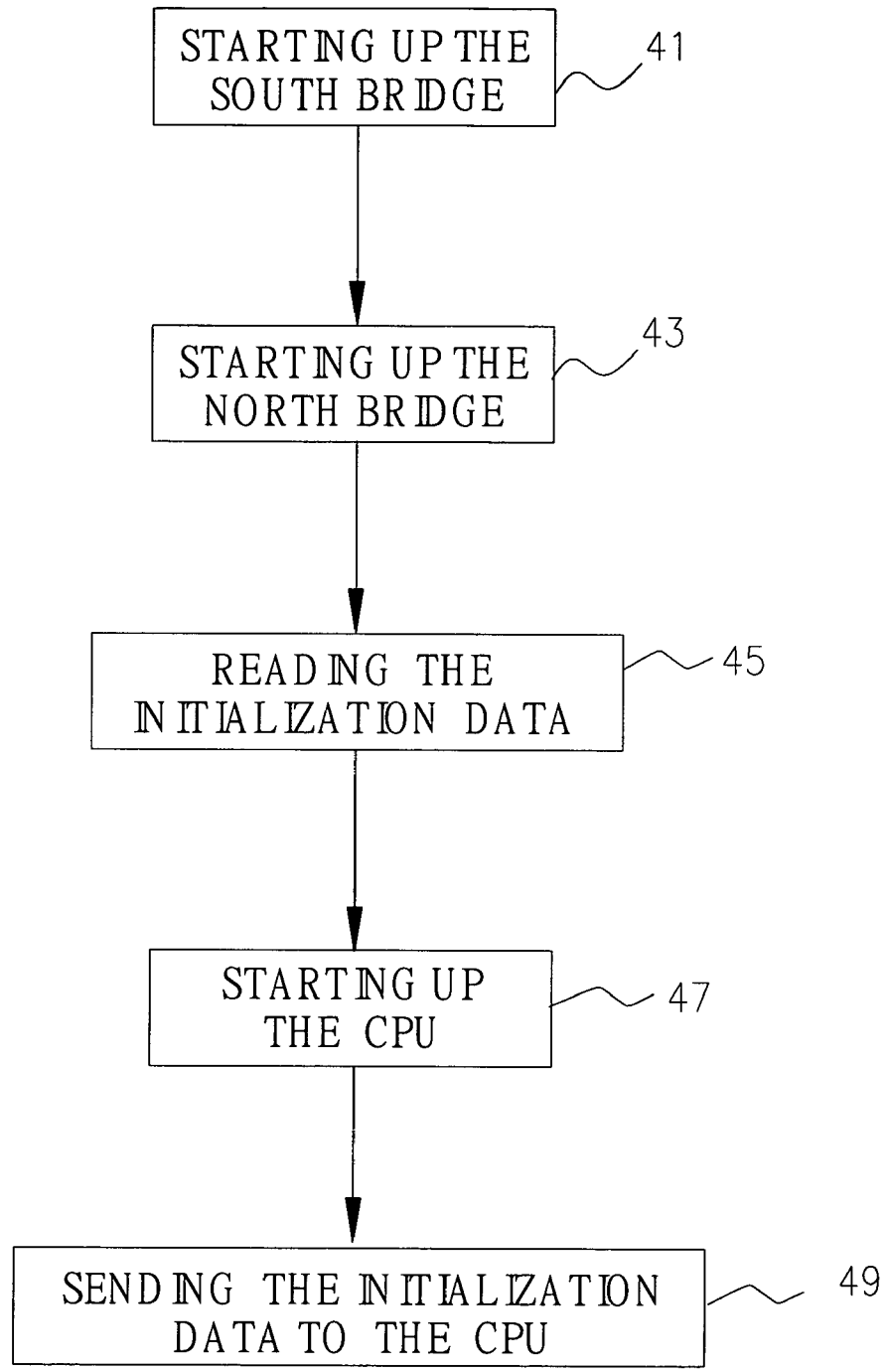
FIG. 4 is a flowchart illustrating the initialization process of the improved computer system in accordance with the preferred embodiment of the invention.

Referring to FIG. 4, a method for accessing initialization data in accordance with the preferred embodiment of the invention is shown in flowchart form. First, as shown in step 41, the south bridge is started up right after the power supply is started up. Then, as shown in step 43, an initiating signal is sent by the south bridge to trigger the north bridge starting up. Next, the north bridge sends transaction T to the south bridge after the north bridge starts up. As shown in step 45, the transaction T is sent for requesting the south bridge to read the initialization data stored in the boot ROM's memory space which the BIOS does not use. Then, as shown in step 47, after the north bridge receives the initialization data from the south bridge, the north bridge triggers the CPU starting up. After that, as shown in 49, the north bridge sends the initialization data to the CPU for setting its initial values.

Therefore, the present invention provides a method and system for storing the initialization data in the boot ROM's memory space not used by the BIOS contained in the boot ROM and retrieving those for the initialization process through both the south bridge and north bridge. The boot ROM is a standard memory device used in the computer system such as the non-volatile memory in a conventional computer system. By using this approach, it is no longer necessary to adopt any additional ROM for storing the initialization data and to use additional input/output ports provided in the north and/or south bridge. As a result, the production cost is effectively reduced.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for accessing initialization data for starting up a central processor unit in a computer system comprising:
providing a non-volatile memory connected to a south-bridge chip, wherein the non-volatile memory includes a first memory space storing routines and code of a basic input/output system (BIOS) and a second memory space storing the initialization data, and wherein the initialization data is excluded from the BIOS and is used for initialization of the central processor unit;
(a) starting up a north-bridge chip that is coupled between the central processor unit and the south-bridge chip;
(b) sending a request from said north-bridge chip to the south-bridge chip in order to access the initialization data from the second memory space of the non-volatile memory;
(c) starting up the central processor unit, wherein step (c) comprises:
receiving said initialization data from the south-bridge chip by said north-bridge chip, and
sending an initiating signal to the central processor unit to set initial values for initialization of the central processor unit based on the received initialization data by said north-bridge chip, wherein no random access memory is used to store said initialization data during step (c).

2. The method according to claim 1 wherein said initialization data is serial initialization packet ("SIP") data of the central processor unit.

3. The method according to claim 2 wherein said initialization data is SIP data for an AMD K7 processor.

4. The method according to claim 1 wherein step (a) comprises starting up the north-bridge chip by said south-bridge chip.

5. The method according to claim 1 wherein step (b) comprises sending a signal from said north bridge chip to said south-bridge chip for requesting said initialization data.

6. The method according to claim 1 further comprising sending said initialization data from said north-bridge chip to the central processor unit of said computer system for starting up the central processor unit.

7. A method for accessing initialization data for starting up a central processor unit in a computer system that also includes a bus, a south-bridge chip connected to the bus, and a north-bridge chip connected between the bus and the central processor unit, the method comprising:
 providing a non-volatile memory connected to the south-bridge chip, wherein the non-volatile memory includes a first memory space storing routines and code of a basic input/output system (BIOS) and a second memory space storing the initialization data, and wherein the initialization data is excluded from the BIOS and is used for initialization of the central processor unit;
 (a) sending a request from the north-bridge chip to the south-bridge chip in order to access the initialization data from the non-volatile memory;
 (b) in response to the request, accessing the second memory space of the non-volatile memory to read out the initialization data by the south-bridge chip;
 (c) sending the initialization data from the south-bridge chip to the north-bridge chip; and
 (d) activating the central processor units, wherein step (d) comprises:
  receiving the initialization data sent from the south-bridge chip by the north-bridge chip,
  sending an initiating signal to the central processor unit to set initial values for initialization of the central processor unit based on the initialization data received by the north-bridge chip from the south-bridge chip, wherein no random access memory is used to store said initialization data during step (d).

8. The method of claim 7 further comprising activating the north-bridge chip by sending a first initiating signal from the south-bridge chip to the north-bridge chip before step (a) is conducted.

9. The method of claim 8, further comprising activating the south bridge chip by a power supply before sending the first initiating signal from the south-bridge chip to actuate the north-bridge chip.

10. The method of claim 7 wherein the non-volatile memory is a read only memory.

11. The method of claim 7 wherein the request sent in step (a) is a transaction sent from the north-bridge chip to the south-bridge chip requesting the south-bridge chip to retrieve the initialization data from the non-volatile memory.

12. The method of claim 7 wherein step (d) further includes:
 sending the received initialization data to the central processor unit.

13. The method of claim 12 wherein the initialization data includes an initialization ID.

14. The method of claim 12 wherein the initialization data includes serial initialization packet ("SIP") data.

15. A system for accessing initialization data for starting a central processor unit, the system comprising:
 a non-volatile memory including: a first memory space storing routines and code of a basic input/output system (BIOS) and a second memory space storing the initialization data, wherein the initialization data is excluded from the BIOS and is used for initialization of the central processor unit;
 a south-bridge chip in direct communication with the non-volatile memory, the south-bridge chip, when requested for the initialization data, accessing the initialization data from the second memory space of the non-volatile memory;
 a north-bridge chip, coupled between the south-bridge chip and the central processor unit, the north-bridge chip, when activated, sending a request for the initialization data to the south-bridge chip;
 wherein in response to the request from the north-bridge chip for obtaining the initialization data, the south-bridge chip accesses the initialization data from the second memory space and forwards the initialization data to the north-bridge chip for activating the central processor unit;
 wherein in response to the initialization data sent from the south-bridge chip, the north-bridge chip sends an initiating signal to the central processor unit to set initial values for initialization of the central processor unit based on the received initialization data from the south-bridge chip in order to activate the central processor unit without using any random access memory to store the initialization data.

16. The system of claim 15 further comprising a power supply for activating the south-bridge chip, wherein the south-bridge chip activates the north-bridge chip when the south-bridge chip is activated.

17. The system of claim 15 wherein the non-volatile memory is a read only memory.

18. The system of claim 17 wherein the non-volatile memory includes a predetermined location for storing the initialization data that is not occupied by the BIOS.

19. The system of claim 15 wherein the initialization data includes an initialization ID.

20. The system of claim 15 wherein the initialization data includes session initialization protocol data.

21. The system of claim 15 wherein the south-bridge chip includes means for:
 activating the north-bridge chip;
 retrieving the initialization data by the south-bridge chip; and
 sending the initialization data to the north-bridge chip.

22. The system of claim 15 wherein the north-bridge chip further includes means for sending an initializing signal to the central processor unit based on the forwarded initialization data.

* * * * *